Sept. 17, 1940.　　　B. P. BISHOP　　　2,214,786
APPARATUS FOR LOGGING HOLES WHILE DRILLING
Filed Aug. 15, 1938
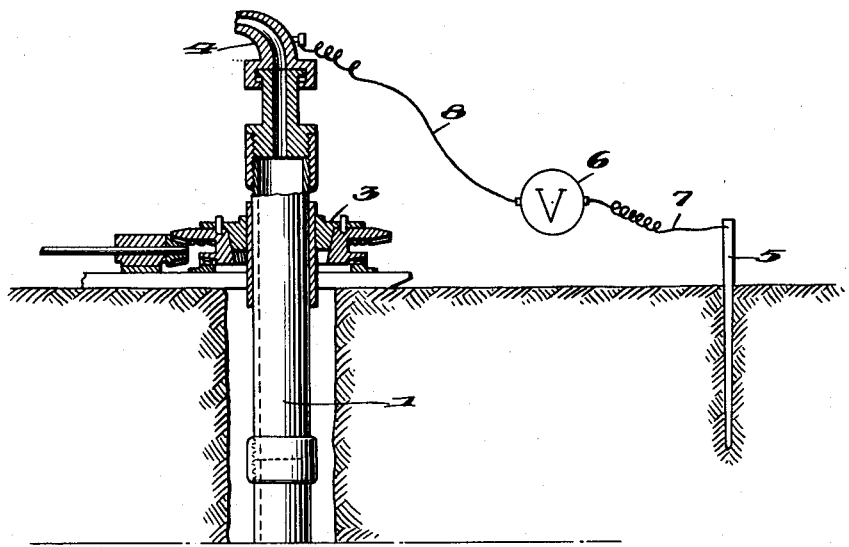
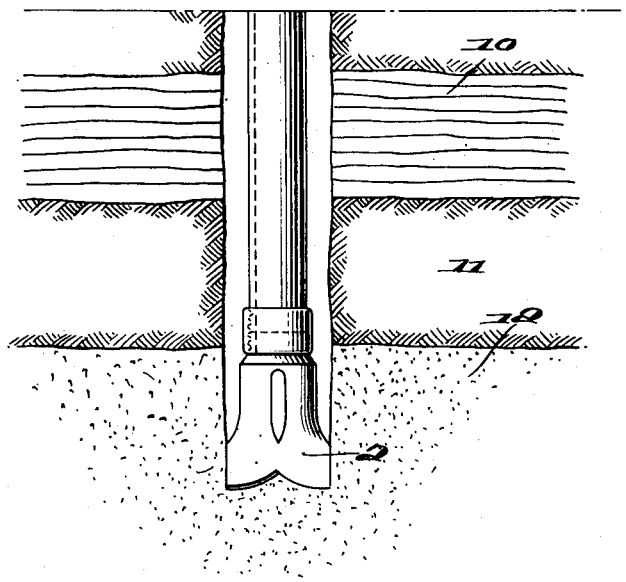
Barton P. Bishop.
Inventor
By J. Vincent Martin
and Ralph R. Browning.
Attorneys Patented Sept. 17, 1940

2,214,786

UNITED STATES PATENT OFFICE 2,214,786

APPARATUS FOR LOGGING HOLES WHILE DRILLING

Barton P. Bishop, Houston, Tex.

Application August 15, 1938, Serial No. 224,836

2 Claims. (Cl. 175—182)

This invention relates to a method of and mean for exploring or "logging" drill holes during the drilling process.

The invention has special utility in connection with the drilling of oil wells. During such an operation, it is very advantageous to be able to determine the approximate nature or character of the particular geological formation or strata which the drill is encountering at any particular moment, since the nature of these strata often indicates to the experienced driller whether or not he may expect to strike an oil bearing formation.

Electrical methods for exploring drill holes have heretofore been proposed. For example, John C. Karcher, in his Patent No. 1,927,664, issued September 19, 1933, discloses a method of "logging" drill holes during the drilling process by continuously measuring the current flowing from a suitable source through a circuit, one terminal of which is connected with the drill and the other terminal to a separate ground electrode. The disadvantage of the Karcher method is, however, that he is forced to employ a drill bit insulated from the usual drill stem, throughout the length thereof, and to provide an insulated conductor extending from the drill bit up to the surface of the ground. The cost of such insulated constructions is very great.

I have discovered that it is possible to obtain electrical measurements indicating the nature of the successive formations encountered by the drill without the necessity of insulating the drill bit from the stem or of utilizing an insulated conductor extending to the surface of the ground. I also find that it is possible to obtain the desired indications without the use of any battery or other artificial source of current.

My invention is based upon the following principles.

The earth is a body of material containing more or less moisture in its different strata and electrical currents flow through the earth by virtue of electrolytic conduction. That is to say, the natural moisture or liquids contained in the pores or interstices of the material making up the earth act as an electrolyte. This moisture or liquid usually consists of aqueous solutions of various minerals or salts occurring in the earth's crust.

Furthermore, as is well known, when two electrodes are placed in contact with an electrolyte or electrolytes, an electromotive force is generated if any one of the four following conditions exist, namely:

1. If the electrodes are different but are in contact with a common electrolyte.
2. If the electrodes are different and are in contact with different electrolytes.
3. If the electrodes are the same, but are in contact with different electrolytes.
4. If the electrodes are the same, and the electrolytes with which they are in contact are of the same character, but of different concentrations.

It is well known that the moisture occurring in different strata of the earth's crust differs widely both as to amount and character. Thus, near the surface there may be relatively little moisture, while in the lower strata there may be much more moisture or electrolyte present, especially where the formation is of a porous nature. Also, in some strata the moisture may consist of relatively pure water, while in other strata it may be heavily charged with salts or other minerals. Moreover, the aqueous solutions at different depths will differ from each other either in character or in degree of concentration. By the term "concentration" I mean not only an actually more concentrated solution but also a condition where there is a larger amount or percentage of solution present per cubic foot of material, as for example in loose sand and gravel or porous sandstone. Thus the moisture or electrolyte present in porous formations may be regarded as more "concentrated" than in less porous materials such as clay or shale.

Basing the invention on the above facts and principles, I find that as different formations are successively encountered by a drill of the usual construction, electromotive forces of varying values are generated in a circuit between such drill and a separate ground electrode. By placing a sensitive indicating instrument such as a potentiometer or milli-voltmeter in this circuit, I am able to determine continuously the relative character of the formations successively encountered by the drill.

In order that the invention may be readily understood, reference is had, by way of illustration, to the accompanying drawing, which shows a conventional rotary drill in side elevation, in position in a drill hole, the earth strata being shown in section, and my improved method of exploring being illustrated.

Referring to the drawing in detail, I designates an ordinary tubular drill stem of the usual type, to the lower end of which is secured any desired type of drill bit 2. The stem I at its upper end passes through the usual rotary 3, to the upper end of which is connected a mud and water swivel 4.

In carrying out my electrical method of exploring the drill hole, I provide an electrode 5 which may consist of a metal bar or rod driven into the ground, as shown.

A sensitive instrument responsive to differences in electromotive force, such as a milli-voltmeter or a potentiometer, is indicated at 6, and this is connected in a circuit by wires 7 and 8 with the electrode 5 on the one hand and some part of the rig which is in electrical contact with the drill stem, on the other hand, such, for example, as the swivel 4, as shown.

It will be understood that the drill stem 1 and drill bit 2 are of the usual or any desired construction, electrically continuous throughout, and wholly free from any insulation.

In accordance with the principles above set forth, the drill bit 2 constitutes one electrode and the rod 5 another electrode, and a potential difference is generated between these two electrodes by reason of the difference in the ground moisture or natural electrolytes respectively in contact with said electrodes.

In one embodiment of the invention, the electrode 5 may be of the same metal as the drill bit 2, namely, iron or steel, and in that case, a potential difference or electromotive force will be generated if conditions Nos. 3 or 4, above enumerated, exist, that is to say, if the aqueous solutions with which the drill 2 is in contact are either different in character from or more concentrated than those with which the electrode 5 is in contact. In practice, it is found that this condition substantially always exists, namely, that the liquids or solutions encountered in the deeper strata are different either in kind or concentration from those near the surface.

In the drawing I have shown by way of illustration, strata of different character 10, 11 and 12. These might be shale, clay and sand or sandstone respectively.

Thus if the shale and clay strata 10 and 11 contain relatively little moisture or solutions of relatively weak concentration, the instrument 6 will show little or no change as the drill passes through them. If, on the other hand, the sandstone or other porous formation 12 is, as is usual, heavily charged with a watery liquid or solution, the electromotive force generated between the drill bit 2 and the electrode 5 will suddenly increase when the drill bit encounters this porous formation. Thus the variations in the reading of the instrument 6, as the drill encounters successive formations, will serve to indicate in general the relative nature of these formations, especially insofar as their porosity is concerned.

Furthermore, if it is known that a given type of formation carries a solution or electrolyte of a certain character, which would therefore, according to well known laws, produce a certain definite electromotive force when in contact with the drill, it may be possible to determine just when this exact type of strata is encountered by observing when the particular electromotive force expected is indicated by the instrument 6.

In practice, the instrument 6 is preferably of the recording type and is arranged to trace a curve upon a moving strip of paper, as the drilling proceeds, thus producing a permanent log of the drill hole.

While I have illustrated and described a drill of the ordinary rotary type, it will be understood that the invention is applicable also to the cable tool or standard rig type of drill. In this case, however, the indications of the instrument 6, instead of being continuous, would be intermittent, the characteristic voltage being produced each time the drill engages the bottom of the hole.

It will also be understood that my improved method can be carried out either where the drill hole is substantially empty as with the cable tool type of drill, or where it is filled with mud and water in accordance with the usual rotary drill practice. In the latter case, even though the drill stem is in contact with the mud and water in the hole, substantially throughout its length, the readings of the instrument 6 will still vary each time a change in the formation occurs, and this variation will be dependent upon the nature of the liquids or electrolytes engaged by the cutting edges of the drill bit, and will thus still serve to continuously indicate the nature of the formations being encountered.

While it is usually possible to obtain satisfactory readings by employing an electrode 5 of the same material as the drill, and depending upon conditions Nos. 3 and 4 to produce the desired results, larger electromotive forces may be generated if desired, by employing a different metal for the electrode 5. As is well known, the further apart in the electrochemical series are the metals of the drill and the electrode, the greater will be the electromotive force generated, either by the same or different electrolytes. Thus by employing an electrode 5 made of aluminum, magnesium or other metal, remote from iron and steel in the electrochemical series, a higher electromotive force can be produced.

Instead of employing a special electrode 5, it may, in many cases, be possible to produce the desired readings by connecting one side of the instrument 6 to the casing of an adjacent well.

From the foregoing, it will be seen that my improved method can be carried out with drills of the usual or any desired construction, no special arrangement being required and no insulation being employed. It will also be observed that no artificial source of current is used, but that the varying potentials generated are due to the action of the natural electrolytes occurring in the earth.

What I claim is:

1. Apparatus for determining the relative character of sub-surface geological strata comprising the usual drill, an uninsulated electrical conductor extending from said drill to the surface, a ground electrode, and an instrument responsive to differences in electromotive force connected in a circuit between said conductor and said electrode, said circuit being devoid of any other source of potential.

2. Apparatus for determining the relative character of sub-surface geological strata comprising a rotary drill bit having the usual tubular stem, electrically continuous therewith, a ground electrode, and an instrument responsive to differences in electromotive force connected in a circuit between the upper end of said stem and said electrode, said circuit being devoid of any other source of potential.

BARTON P. BISHOP.